(12) United States Patent
Hauser et al.

(10) Patent No.: US 10,124,271 B2
(45) Date of Patent: Nov. 13, 2018

(54) ROTARY EVAPORATOR

(71) Applicant: KNF Neuberger GmbH, Freiburg (DE)

(72) Inventors: Erwin Hauser, Emmendingen (DE); Erich Becker, Bad Krozingen (DE)

(73) Assignee: KNF NEUBERGER GMBH, Freiburg (DE)

( * ) Notice: Subject to any disclaimer, the term of this patent is extended or adjusted under 35 U.S.C. 154(b) by 796 days.

(21) Appl. No.: 14/350,240

(22) PCT Filed: Sep. 17, 2012

(86) PCT No.: PCT/EP2012/003879
§ 371 (c)(1),
(2) Date: Apr. 7, 2014

(87) PCT Pub. No.: WO2013/050108
PCT Pub. Date: Apr. 11, 2013

(65) Prior Publication Data
US 2014/0238621 A1 Aug. 28, 2014

(30) Foreign Application Priority Data
Oct. 8, 2011 (DE) .................... 20 2011 106 535 U

(51) Int. Cl.
*B01D 1/22* (2006.01)
*B01D 3/08* (2006.01)
(Continued)

(52) U.S. Cl.
CPC ............ *B01D 1/228* (2013.01); *B01D 3/085* (2013.01); *B01L 9/04* (2013.01); *F16M 11/105* (2013.01);
(Continued)

(58) Field of Classification Search
CPC ........... B01D 3/085; F16M 11/06; B01L 9/04
See application file for complete search history.

(56) References Cited

U.S. PATENT DOCUMENTS 1,457,825 A * 6/1923 Devan ....................... B66F 3/10
254/102
3,203,269 A * 8/1965 Perrine ................... B64C 13/00
74/89.35

(Continued)

FOREIGN PATENT DOCUMENTS

DE 3447433 6/1986
DE 3447433 A1 * 6/1986 ........... B01D 1/0082
(Continued)

OTHER PUBLICATIONS

Macine Translation of Vollgold (EP 0156937 A1) obtained from Espacenet on Nov. 7, 2016.*

*Primary Examiner* — Bobby Ramdhanie
*Assistant Examiner* — Briana M Obenhuber
(74) *Attorney, Agent, or Firm* — Volpe and Koenig, P.C.

(57) ABSTRACT

The invention relates to a rotary evaporator (1), including an equipment stand (2) with a protruding guide tower (3) which has a holder on which an evaporation vessel (5) is pivotably retained about a horizontal pivot axis (42). In one embodiment of the invention, the holder includes a holding part connected to the guide tower, wherein a carrying part (43) that can be connected to the evaporation vessel (5) is pivotably retained about a horizontal pivot axis on the holding part, and a spindle drive (44), which includes an adjustment spindle (45) with a self-locking spindle thread (46), is provided to adjust and secure the selected pivot position.

3 Claims, 9 Drawing Sheets

(51) Int. Cl.
*B01L 9/04* (2006.01)
*F16M 11/18* (2006.01)
*F16M 11/24* (2006.01)
*F16M 11/42* (2006.01)
*F16M 11/10* (2006.01)

(52) U.S. Cl.
CPC ............ *F16M 11/18* (2013.01); *F16M 11/24* (2013.01); *F16M 11/425* (2013.01); *F16M 2200/021* (2013.01); *F16M 2200/048* (2013.01)

(56) References Cited

U.S. PATENT DOCUMENTS

| | | | | |
|---|---|---|---|---|
| 5,556,067 | A | * | 9/1996 | Konig ........................ B01L 9/00 248/220.21 |
| 5,919,339 | A | * | 7/1999 | Ikeda ........................ B01L 9/00 248/220.21 |

FOREIGN PATENT DOCUMENTS

| | | |
|---|---|---|
| DE | 3522607 | 1/1987 |
| EP | 0156937 | 10/1985 |
| GB | 2171922 | 9/1986 |

\* cited by examiner

ROTARY EVAPORATOR

BACKGROUND

The invention relates to a rotary evaporator having a device stand, from which a guide tower projects, said guide tower has a holder, on which an evaporation vessel is held so as to be pivotable about a horizontal pivot axis and which comprises a holding part which is connected to the guide tower, is movable laterally of the guide tower in the longitudinal direction thereof and on which a carrying part, which is connectable to the evaporation vessel, is held so as to be pivotable about a horizontal pivot axis.

Different designs of rotary evaporators are already known. Such rotary evaporators are intended for the gentle separation of liquid mixtures and solutions utilizing the variable boiling points of the components. Thus, rotary evaporators can also be utilized for drying, for solvent recovery and for similar processes. A heating bath in which a heated volume of water or oil is situated regularly serves as an evaporator element. An evaporator piston, which includes the solution to be evaporated in its piston interior, rotates in the heated water or volume of oil in the heating bath. Said solution is distributed on the heated inside walls of the piston of the rotating evaporator piston as a thin liquid film which can easily evaporate there. As a result of the rotation of the evaporator piston delay in boiling is also avoided and in conjunction with the heating bath a homogeneous temperature distribution is obtained in the medium to be evaporated. The additionally brought about thorough mixing of the heating bath facilitates the regulating of the effective heating temperature in a considerable manner. To avoid high temperatures which are linked to risks for the user and can also produce unwanted chemical reactions in the medium, the evaporating process is supported by an evacuating of the process chamber. The evaporator capacity is varied as a result of the temperature of the heating bath, the size of the piston and the speed of rotation of the evaporator piston as well as of the vacuum pressure set. On account of the general inertia of the temperatures of the medium and the process, the evaporation at constant temperatures is primarily controlled by the pressure. In order to be able to evacuate the process chamber, and in order to be able to connect the necessary coolant inflows and outflows to the required cooler, at least one hose connection, and regularly several hose connections which are connected to a vacuum pump or to a coolant inflow or outflow in each case by means of a flexible hose line, is provided on the glass assembly of the rotary evaporator which includes the evaporator piston.

Over the past decades, the usability, the safety and the automation of previously known rotary evaporators has been improved in a considerable manner. Occasionally, however, some disadvantages can be ascertained.

GB 2171922 has already previously made known a rotary evaporator of the type mentioned in the introduction with a device stand from which projects a guide tower which has a holder on which an evaporation vessel is held so as to be pivotable about a horizontal axis. The holder comprises a holding part which is connected to the guide tower and is movable laterally of the guide tower in the longitudinal direction thereof. A carrying part which is connectable to the evaporation vessel is held on the holding part so as to be pivotable about a horizontal pivot axis, a locking screw which comprises an adjusting head or similar handle on its one screw end for manual activation being provided to adjust and secure the chosen pivot position. The previously known rotary evaporator can be adapted to the different dimensions of various evaporation vessels, but the device structures realized with the previously known rotary evaporator are no longer able to be reproduced easily at a later time.

EP 0 156 937 A1 has previously made known a rotary evaporator which has a plate-shaped device stand. A tower, on the free tower end of which a pivot arm serving as a holder is pivotably mounted, projects above the device stand. An evaporation vessel is held on the arm end of the pivot arm remote from the tower so as to be rotatable about its longitudinal axis. By pivoting the pivot arm the evaporation vessel is arbitrarily adjustable between two end positions such that as a result of immersing the evaporation vessel at different depths into the water bath different quantities of heat can be supplied or the supply of heat is interrupted. In order to be able to immerse the evaporation vessel into the water bath or lift it out of the water bath and in order to be able to modify the height of the evaporation vessel for this purpose, the pivot arm serving as a holder is pivotable electromechanically, pneumatically or hydraulically between two end positions in both pivot directions and securable in each case in the chosen pivot position. In this case, an embodiment described in EP 0 156 937 A1 provides that the pivot arm is pivotable by means of a threaded spindle which cooperates with the pivot arm. The pivot arm is pivoted to adjust the evaporation vessel vertically. Insofar as a spindle drive with an adjusting spindle is provided in EP 0 156 937 A1, said spindle drive is provided for pivoting the pivot arm.

In the case of the previously known rotary evaporators, a holder, on which an evaporation vessel, which is realized in the majority of cases as an evaporation piston, is held so as to be pivotable about a horizontal pivot axis, is provided on the guide tower projecting above the device stand. This holder is secured on the guide tower in the majority of cases by way of a screw connection which has to be released prior to the pivoting of the holder and retightened again after the pivoting. In this case, there is the risk of the glass assembly, which is fastened on the holder and also includes the evaporation vessel, falling into the stop such that the fracture-sensitive evaporation vessel which is additionally under vacuum can break. The awkward pivotability of the holder provided on previously known rotary evaporators makes changing the evaporation vessels and exchanging a larger or smaller evaporation vessel difficult, which can also possibly make it necessary to modify the pivot angle. The exchanging of larger or smaller evaporation vessels is also additionally made more difficult as a result of the exchanged evaporation vessel having to be able to be properly immersed into the heating bath situated in the tempering vessel of the rotary evaporator, it only being possible to take the different dimensions of the various evaporation vessels into account by changing the lifting height and the pivot angle.

SUMMARY

Consequently, the object is to create a rotary evaporator which is able to be adapted easily and conveniently to the different dimensions of the various evaporation vessels, wherein reproducibility of the device structures realized with the rotary evaporator according to the invention is to be ensured in as simple and secure a manner as possible.

The proposal according to the invention for achieving this object provides that the holding part is realized as a cradle, that a spindle drive which has an adjusting spindle with a self-locking spindle thread is provided to adjust and secure the selected pivot position, that the adjusting spindle is mounted on the holding part so as to be pivotable, but immovable in the axial direction, that the adjusting spindle interacts with a spindle nut which is held on the carrying part so as to be pivotable about a horizontal axis, that the adjusting spindle comprises an adjusting wheel or similar handle on at least one spindle end, that a graduation, which is arranged between the holding part and the carrying part, is provided for positioning the carrying part, that the graduation has a scale which is provided on the holding part or on the carrying part, and that the scale has associated therewith a measuring line or similar indicator which is arranged on the carrying part or on the holding part.

The holder provided on the rotary evaporator according to the invention comprises a holding part which is connected to the guide tower and is realized as a cradle which is movable in the longitudinal direction on the guide tower. A carrying part which is connectable to the evaporation vessel is held on said holding part so as to be pivotable about a horizontal pivot axis. A spindle drive which has an adjusting spindle with a self-locking thread is provided for adjusting and securing the chosen pivot position. An adjusting wheel or similar handle is provided on at least one spindle end of the adjusting spindle in order to make simple handling of the rotary evaporator possible. By rotating said handle, the adjusting spindle, which is non-rotatably connected thereto, is also rotated in such a manner that the spindle nut located, for example, on the pivotably mounted carrying part changes its relative position on the adjusting spindle in the longitudinal direction. By rotating said adjusting spindle, the pivot angle between the holding part and the carrying part of the holder can be modified and the pivot position of an evaporation vessel fastened on the carrying part can be varied. As the adjusting spindle has a self-locking spindle thread, additional locking is not necessary. In the case of the rotary evaporator according to the invention, the pivot angle of the evaporation vessel can easily be modified and adapted to the different dimensions of the various evaporation vessels intended for use. In this case, the rotary evaporator according to the invention is developed structurally in a particularly simple manner and consists of comparatively few constituent parts. In order to ensure simple and secure reproducibility of the device structures realized with the rotary evaporator according to the invention and in order to facilitate the handling thereof even more, the rotary evaporator according to the invention comprises a graduation which is arranged between the holding part and the carrying part for positioning the carrying part. This graduation has a scale which is provided on the holding part or on the carrying part, wherein the scale has associated therewith a measuring line or similar indicator which is arranged on the carrying part or on the holding part.

In this case, a particularly simple and advantageous design according to the invention provides that the adjusting spindle is held on the holding part and on the carrying part so as to be pivotable about a horizontal pivot axis.

Further features of the invention are produced from the following description of an exemplary embodiment according to the invention in conjunction with the claims and the drawing. The individual features can each be realized individually on their own or several together in the case of an embodiment according to the invention.

DETAILED DESCRIPTION OF THE PREFERRED EMBODIMENTS

Figure 1:
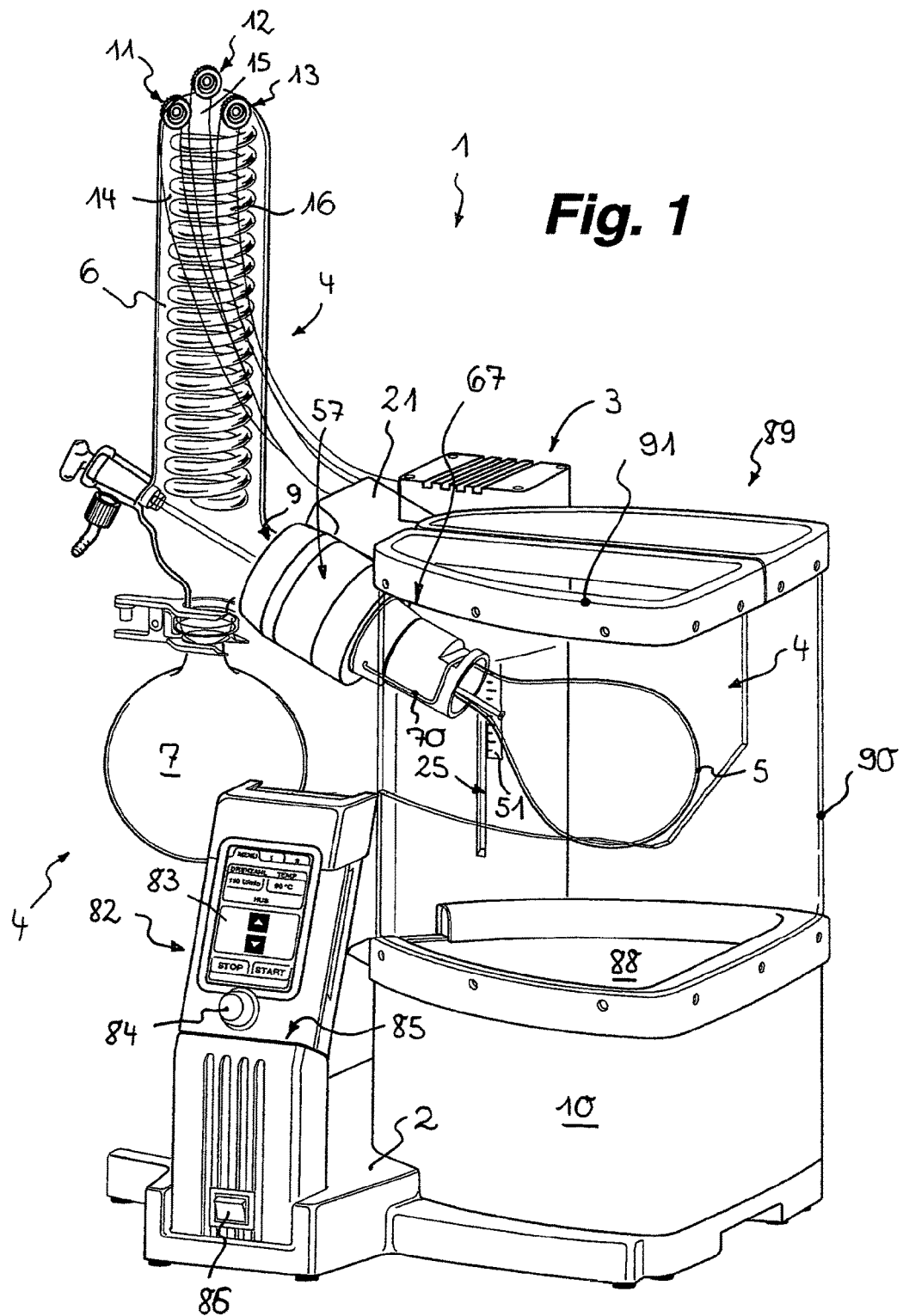
FIG. 1 shows a perspective overall representation of a rotary evaporator which has a device stand from which a guide tower projects, wherein on the side of the guide tower a cradle which serves as a holder is movable, said cradle carrying a glass assembly with an evaporation vessel which can be immersed into a tempering vessel, and wherein the evaporation vessel has associated therewith a rotary drive which allows the evaporation vessel to rotate about its longitudinal axis in the tempering vessel.

FIG. 1 shows a perspective view of a rotary evaporator 1. The rotary evaporator 1 has a device stand 2 which carries the structure of the rotary evaporator. A guide tower 3, which has a vertically oriented longitudinal axis, protrudes from the device stand 2. The rotary evaporator 1 has a glass assembly 4 which includes an evaporation vessel 5 which is realized here as an evaporator piston, a cooler 6 and a collecting vessel 7 which is detachably connected to the cooler 6. In this case, the evaporation vessel 5 is held by a hollow glass shaft 8 which serves as a vapor feedthrough, is shown in more detail in FIGS. 6, 7 and 9 and opens out at its shaft end which is remote from the evaporation vessel 5 in a connecting piece 9 of the cooler 6.

The rotary evaporator 1 comprises a tempering vessel 10 which is realized here as a heating bath, into which the evaporation vessel 5 immerses in regions. In order to be able to position the evaporation vessel 5 with a part region in the tempering vessel 10 and in order to be able to interrupt the evaporating process by removing the evaporation vessel 5 out of the tempering vessel 10 where required, the glass assembly 4 and with it the evaporation vessel 5 is held so as to be movable on the guide tower 3.

A heated volume of water or of oil is situated in the tempering vessel 10 which is realized here as a heating bath. The evaporation vessel 5, which includes the solution to be evaporated in its piston-shaped interior, rotates in the heated volume of water or oil of the tempering vessel 10. Said solution is distributed onto the heated vessel inside walls of the rotating evaporation vessel 5 as a thin liquid film which is able to evaporate easily there. As a result of the rotation of the evaporation vessel 5, a delay in boiling is also avoided and in conjunction with the heating bath 10, which is situated in the tempering vessel 10, a homogeneous temperature distribution is obtained in the medium to be evaporated. The thorough mixing of the heating bath which is additionally brought about facilitates the regulating of the effective heating temperature in a considerable manner. To avoid high temperatures which are linked to risks to the user and can also bring about unwanted chemical reactions in the medium, the evaporating process is supported by creating a vacuum in the process chamber. The evaporator capacity is varied as a result of the temperature of the heating bath, the size of the evaporation vessel 5 and its rotational speed as well as the vacuum pressure set. On account of the general inertia of the temperatures of the medium and the process, the evaporation is controlled at constant temperatures primarily by the pressure. In order to be able to create a vacuum in the process chamber and in order to realize a coolant inflow and outflow 6, at least one hose connection and regularly several hose connections 11, 12, 13, which are connected to a vacuum pump or to the coolant inflow and outflow by means of in each case a flexible hose line 14, 15, 16, are provided on the glass assembly of the rotary evaporator which also includes the evaporation vessel 5.

Figure 2:
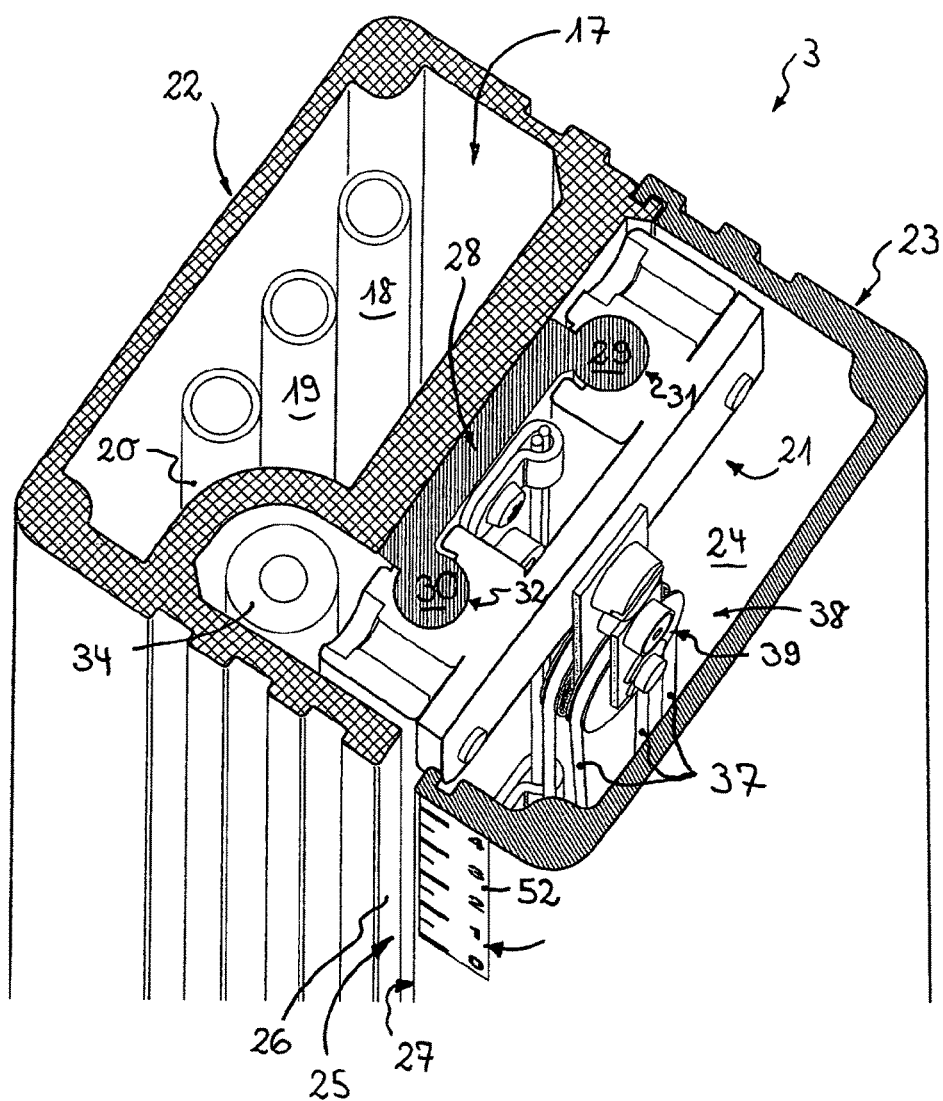
FIG. 2 shows a perspective cross sectional representation of the guide tower of the rotary evaporator shown in FIG. 1.

From the perspective cross sectional representation in FIG. 2 it is clear that the guide tower 3 comprises a channel 17 which is oriented in the longitudinal extension thereof, in which channel is provided a line portion of at least one fluid line which is connected to the glass assembly 4. The at least one fluid line ends in a hose connection which is associated therewith but is not shown any further here and is arranged on a bottom-side region of the rotary evaporator which is remote from the free end of the guide tower 3. As, consequently, a comparatively long line portion of the at least one fluid line is guided in the channel 17 of the guide tower 3, the line portion of said fluid line which is laid freely outside the guide tower 3 and is realized here as hose line 14, 15 or 15 can be kept comparatively short. The risk of an inadvertent entanglement in said freely laid hose lines 14, 15, 16 is consequently minimized. As the at least one fluid line inside the guide tower 3 is guided downward, the connections of said fluid lines can be arranged on non-moving parts of the structure in the bottom-side region of the rotary evaporator 1 which is remote from the free end of the guide tower 3. In the case of the rotary evaporator shown here, the connections of the fluid lines are arranged in the base plate of the device stand 2.

In order to be able to guide the fluid line which leads to a vacuum pump as well as the fluid lines provided as coolant inflow and outflow and consequently several fluid lines in the channel 17 of the guide tower 3, it is provided that the line portions guided in the channel are realized as hose lines 18, 19, 20. In this case, the hose lines 18, 19 20 guided in the channel 17 and serving as a line portion are also connected at their line portion end remote from the bottom-side first hose connection to a second hose connection (not shown here either) which is arranged on the free end region of the guide tower 3.

In order to be able to move the glass assembly 4 in a vertical direction, and in order to be able to lower the evaporation vessel 5 thereof into the tempering vessel 10 as well as also being able to lift it out of the tempering vessel 10 again, the glass assembly is held on a holder which is realized as a cradle or comprises a cradle 21. The cradle 21 is movable to the side of the guide tower 3. As the guide tower 3 consequently remains non-moving, the parts moved during the lifting and lowering of the evaporation vessel 5 can be minimized.

The guide tower 3 is formed from at least two profile portions 22, 23 which are preferably releasably connected together in a separating position which is oriented in the longitudinal extension of the guide tower 3. In this case, the guide tower 3 comprises a profile portion 22 which is realized as a hollow profile, the at least one hollow profile interior of which forms the channel 17 of the guide tower 3. The profile portions 22, 23 of the guide tower 3 define a cavity 24 which is realized open at a guide slot 25 which is oriented in the vertical direction. In the separating position the guide slot 25 is arranged between the profile portions 22, 23 and is defined by the adjacent narrow edges 26, 27 of said profile portions 22, 23. The cradle guide means 28 associated with the cradle 21 is provided in the cavity 24. This cradle guide means 28 comprises two guide bars 29, 30, which are spaced apart from one another transversely with respect to the guide direction, are round in cross section and are encompassed by guide holes 31, 32 in the cradle 21.

The cradle 21 carries at least one connecting arm 33 which penetrates the guide slot 25 and is connected to the glass assembly 4. The cradle 21 is movable from a lifting position against the resetting force of at least one gas-filled spring 34 into a lowering position. A cable winch 35, which serves as a lifting drive and is held fixed in position with respect to the guide tower 3 on the structure of the rotary evaporator 1, is provided to move the cradle 21. The cable winch 35 comprises a cable 37 which can be wound onto a cable drum 35 and is guided on the cradle 21 in such a manner that by winding the cable 37 in and out and shortening and lengthening the cable portion protruding over the cable winch 35, the cradle 21 can be lifted by the resetting force or lowered against the resetting force. In the case of a power failure, the cable winch 35 releases the cable 37 wound thereon in such a manner that the resetting force is able to move the cradle 21 into the lifting position; as the cradle 21 is consequently automatically moved in the case of a power failure into its lifting position, in which the evaporation vessel 5 is situated at a spacing above the tempering vessel 10, the process running in the evaporation vessel 5 is interrupted as a precaution and an uncontrolled overheating of the liquid to be evaporated is safely stopped.

Figure 3:
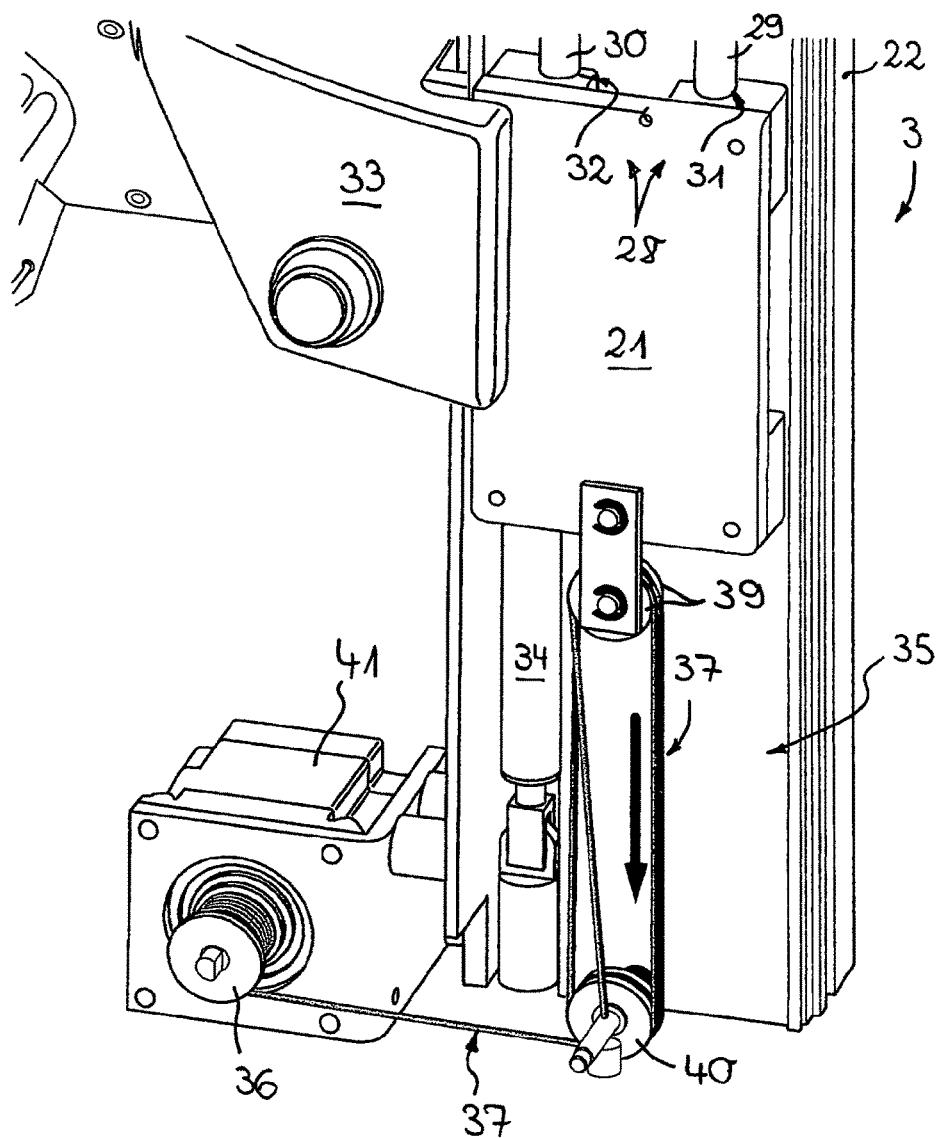
FIG. 3 shows a schematized component part representation of the lifting drive which is arranged in the guide tower and is intended for moving the cradle which serves as a holder on the guide tower.

It can be seen in FIG. 3 that the cable 37 of the cable winch 35 is guided by means of a block and pulley 38, which block and pulley 38 has guide rollers 39, 40 which are spaced apart from one another. The block and pulley 38 comprises here a drive. The cable winch 35 has a stepping motor as an electric drive 41. As said stepping motor has a comparatively high torque, an additional gear unit is superfluous. As the drive shaft of the electric drive 41 with the motor switched off is almost torque-free, a safe emergency shut-down can also be guaranteed when there is an interruption in the power by the at least one gas-filled spring 34 serving as resetting force moving the cradle 21 into the upper lifting position. In this case, the at least one gas-filled spring 34 presses the cradle 21 in the upper lifting position against a top end stop. By means of an adjustable bottom stop, the depth of immersion of the evaporation vessel 5 in the heating bath of the tempering vessel 10 can be adjusted in dependence on the size and fill volume of the chosen evaporation vessel 5. By means of the stepping control of the electric drive 41, the cradle 21 can be moved in any desired lifting position. In this case, the top end stop serves as a reference for the stepping control of the electric drive 41.

The lifting mechanism which is formed by the cable winch 35, the electric drive 41 and the block and pulley 38 and serves at the start and end of the process for lowering and lifting out the evaporation vessel 5 and for fine adjustment of its depth of immersion in the heating bath, is distinguished by a comparatively long lifting travel which, when large evaporation vessels 5 are used, also ensures that they are completely lifted out of the tempering vessel 19. The speed of the electric drive 41 associated with the cable winch 35 is variable and comprises at least two speed stages. Whilst a high speed ensures a high traveling speed of the cradle 21 for rapid lowering or lifting out of the evaporation vessel 5, at a speed which is lower in comparison a lower speed of the cradle 21 which is intended for fine adjustment of the depth of immersion of the evaporation vessel 5 is obtained.

Figure 4:
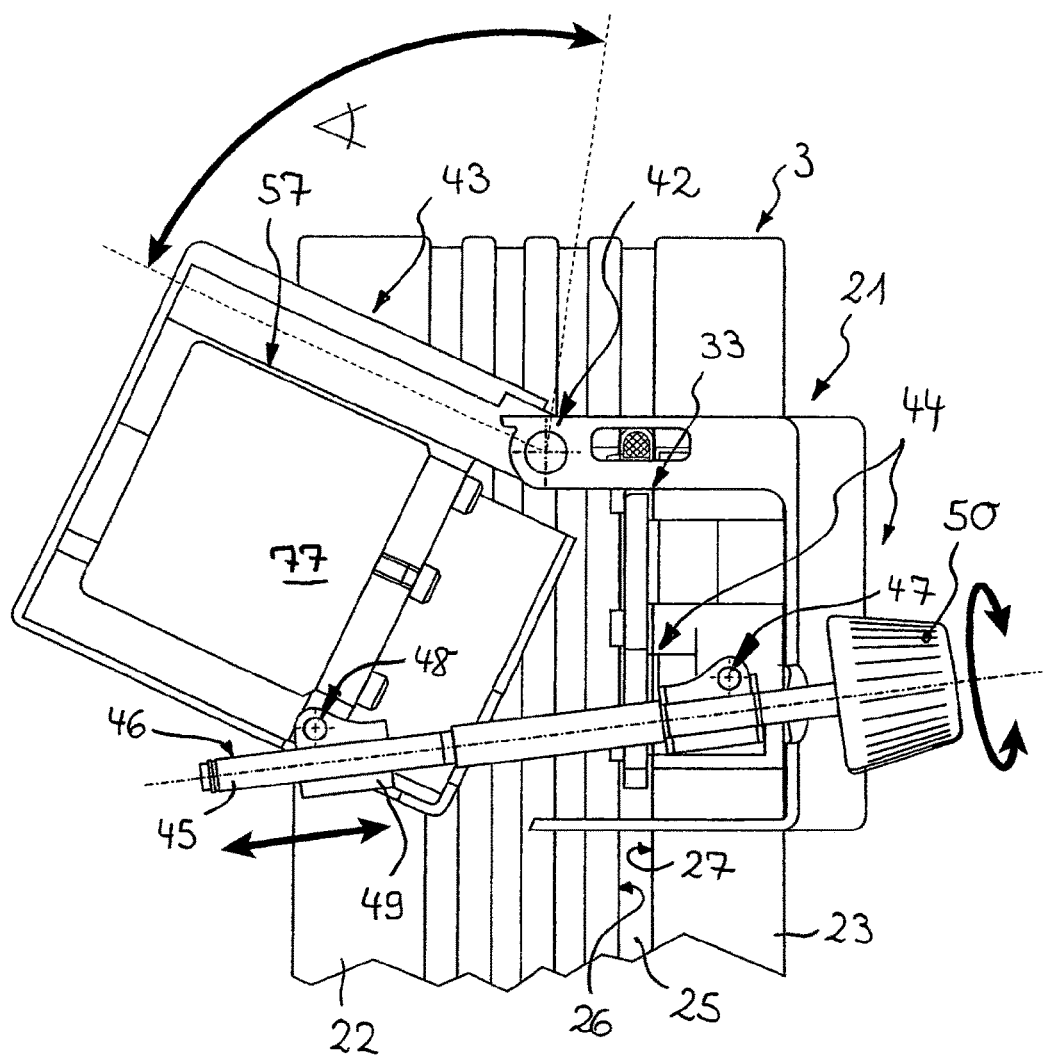
FIG. 4 shows a longitudinal section of the cradle which is movable on the guide tower and which carries the glass assembly, wherein a rotary drive which is pivotable about a horizontal pivot axis is provided on the cradle, by means of which rotary drive the evaporation vessel of the glass assembly is rotatable in the tempering vessel of the rotary evaporator.

It can be seen from FIG. 4 that the cradle 21 here is a component part of a holder which serves for fastening the glass assembly 4 on the cradle 21. The glass assembly 4 shown in more detail in FIGS. 1 and 6 and in particular the evaporation vessel 5 thereof is held on the holder so as to be pivotable about a horizontal pivot axis 42. The holder comprises for this purpose a holding part which is realized here as a cradle 21, on which a carrying part 43 which is connectable to the evaporator device 5 is held so as to be pivotable about the horizontal pivot axis 42. A spindle drive 44 which has an adjusting spindle 45 with a self-locking spindle thread 46 is provided to adjust and secure the chosen pivot position. By rotating said adjusting spindle 45, the pivot angle between the holding part realized as a cradle 21 and the carrying part 43 of the holder can be modified and the pivot position of an evaporation vessel 5 fastened on the carrying part 43 can be varied. As the adjusting spindle 45 has a self-locking spindle thread 46, an additional and where applicable also inadvertently released safety device is not necessary. The spindle drive 44 allows the rotary evaporator 1 to be adapted to the different dimensions of the various evaporation vessels. The carrying part 43 of the holder carries the entire glass assembly 4, the center of gravity of which lies far off-center. Without the self-locking of the spindle thread 46, there would be the risk of the glass assembly, when releasing an alternative locking arrangement, falling unbraked into the bottom stop and breaking, with the glass assembly being under a vacuum, there also being the possibility of a danger of implosion.

It can be seen in FIG. 4 that the adjusting spindle 45 is held on the holding part realized as a cradle 21 and on the carrying part 43 so as to be pivotable preferably about a horizontal pivot axis 47, 48. The adjusting spindle 45, which is mounted on the holding part realized as a cradle 12 so as to be pivotable, but immovable in the axial direction, interacts with a spindle nut 49 which is held on the carrying part 43 so as to be pivotable about the pivot axis 48. On its one spindle end, the adjusting spindle 45 comprises an adjusting wheel 50 which serves as a handle. Adjusting speed and force expenditure can be optimized by selecting the thread type of the adjusting thread 46 and of the pitch. As the adjusting thread 46 is realized in a self-locking manner, no further locking means is necessary which otherwise, when released, harbors the danger of the glass assembly inadvertently falling into the stop and breaking. The spindle drive 44, by way of which the tilt angle of the evaporation vessel 5 is able to be modified in a stepless manner, is also actuatable on the adjusting wheel 50 with only one hand. In conjunction with the variable depth of immersion of the evaporation vessel 5 into the tempering vessel 10 and the displaceability of the tempering vessel 10 described in more detail further below, the pivot mechanics shown in FIG. 4 allow a wide spectrum of variously large evaporation vessels 5 with variable fill volumes to be able to be used.

Figure 5:
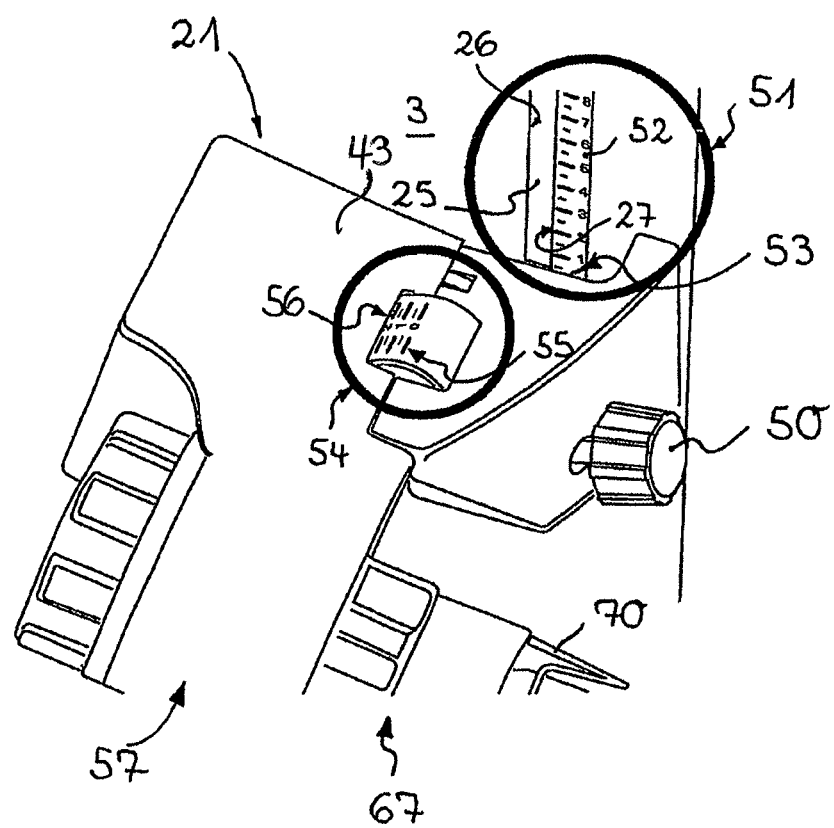
FIG. 5 shows a perspective view of a detail of the guide tower from FIGS. 2 to 4 in the region of the cradle, wherein a graduation can be seen on the guide tower for indicating the lift height and a graduation can be seen on the cradle for indicating the pivot angle chosen for the rotary drive.

From a comparison of FIGS. 1 and 5 it is clear that the cradle 21, which is movable on the guide tower 3 in the vertical direction, is positionable by means of a graduation 51 which comprises a scale 52 which is provided on the outer circumference of the guide tower 3 and interacts with an indicator located on the cradle 21. Whilst the scale 52 is arranged on the outside wall edge region of the guide tower 3 adjacent the guide slot 24, the adjacent edge 53 of the cradle 21 serves as an indicator of the respective lifting height.

A further graduation 54, which is provided between the cradle 21 serving as a holding part and the carrying part 43, is provided for positioning the carrying part 43. This graduation 54 also comprises a scale 55 which is provided in this case on the cradle 21. Said scale 55 has associated therewith an indicator which is arranged on the carrying part 43. The indicator, in this case, is formed by the adjacent edge 56 of the carrying part 43. The respective pivot angle of the glass assembly 4 which is held by means of the holder on the guide tower 3 can be measured by means of the graduation 54. The graduations 51, 54 facilitate the reproducibility of a test assembly in a considerable manner and promote the simple handling of the rotary evaporator 1 shown here.

Figure 6:
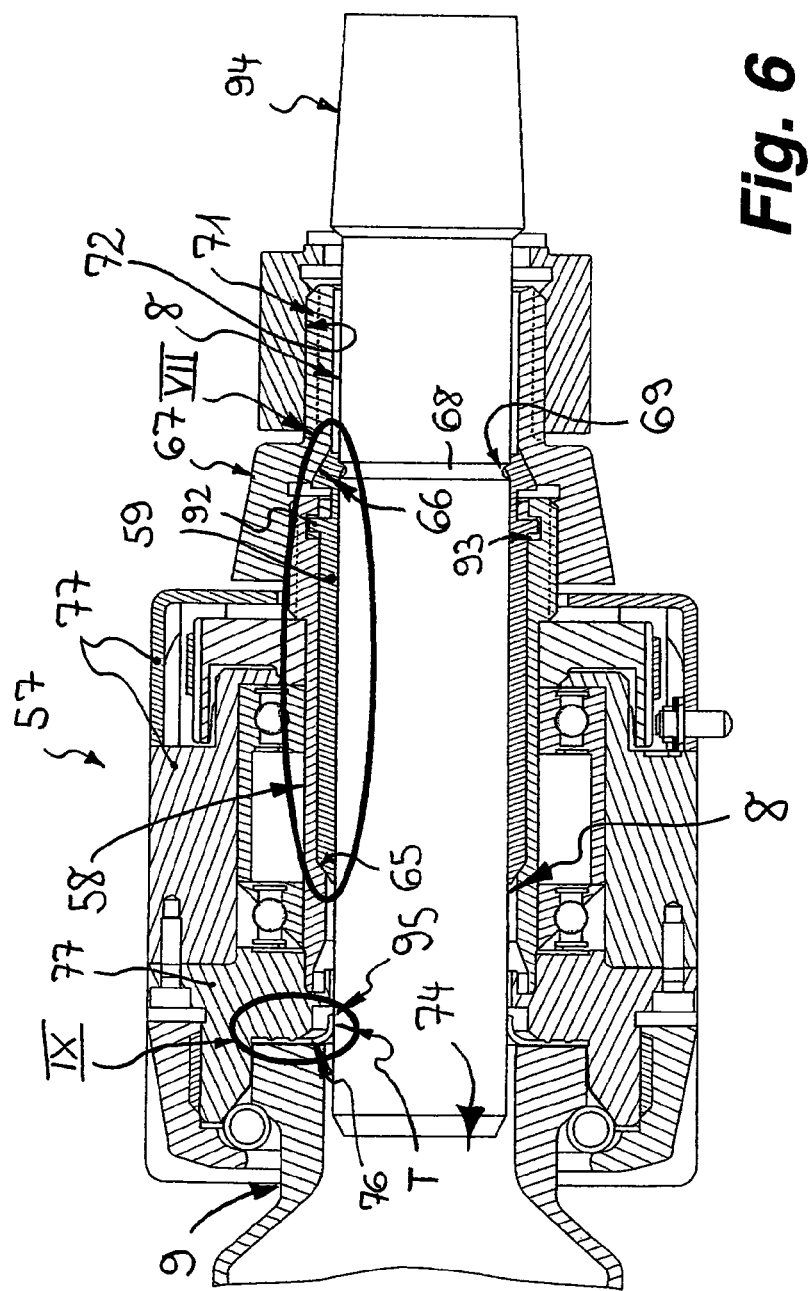
FIG. 6 shows a longitudinal section of the rotary drive from FIG. 4, wherein the rotary drive has a rotationally-drivable hub which penetrates a vapor feed-through which is realized as a hollow glass shaft, wherein the hollow glass shaft carries the evaporation vessel at its one shaft end and opens out into a connecting piece which leads to a cooler with its other shaft end, and wherein the rotary movement of the rotationally-drivable hub of the rotary drive is transmitted to the hollow glass shaft by means of a sleeve-shaped clamping insert which is slipped onto the hollow glass shaft.
Figure 8:
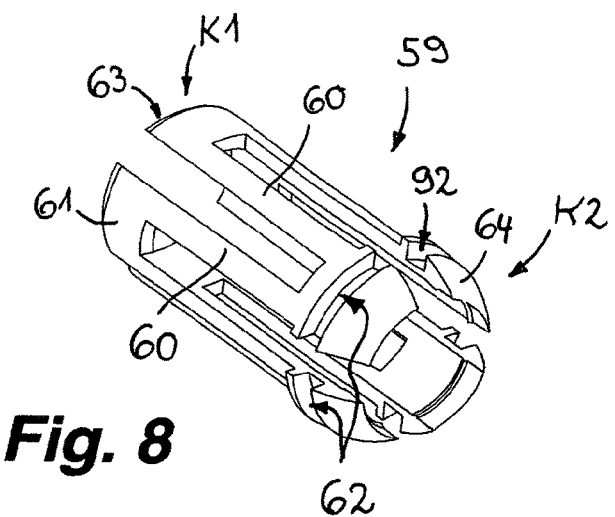
FIG. 8 shows a perspective representation of the clamping insert from FIGS. 6 and 7.
Figure 7:
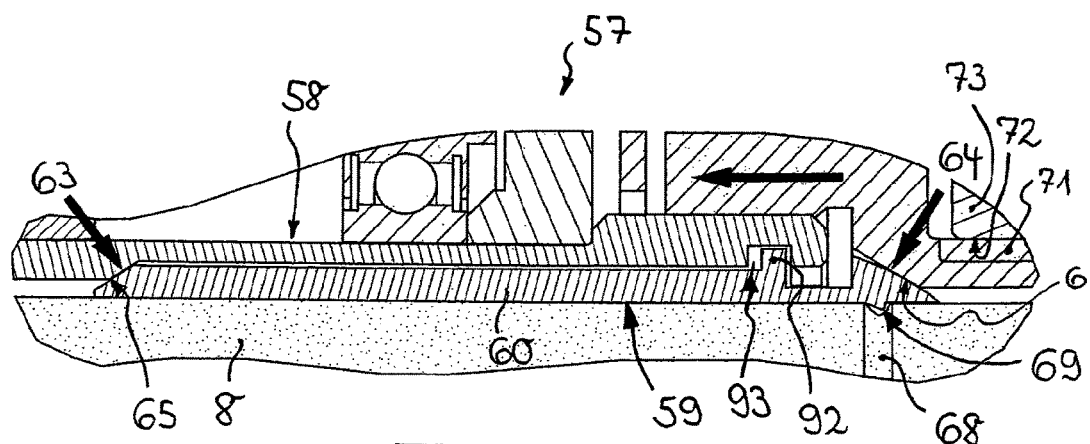
FIG. 7 shows a longitudinal section of a detail of the rotary drive from FIGS. 4 and 6 in the region of the clamping insert slipped onto the hollow glass shaft.

FIG. 6 shows a longitudinal section of a detail of the rotary evaporator 1 in the region of its rotary drive 57 provided on the carrying part 43 of the holder. The rotary drive 57 comprises a hub 58 which is rotationally drivable by means of an electric drive motor. The drive motor (not shown any further) of the rotary drive 57 is developed here as a brushless direct current motor with toothed belt drive. In order to be able to transmit the rotary movement of the hub 58 to the hollow glass shaft 8 carrying the evaporator vessel 5, the clamping insert 59 shown in more detail in FIGS. 7 and 8 is slipped onto said hollow glass shaft 8. The clamping insert 59 intended for clamping the hollow glass shaft 8 in the hub 58 has a sleeve-like basic form. For this purpose the clamping insert 59 comprises support bars 60 which are oriented in the longitudinal direction and are connected together by means of connecting webs 61, 62 which are oriented in the circumferential direction of the clamping insert 59. The connecting webs 61, 62 alternately connect the web ends of adjacent supporting webs 60 arranged on the one or on the other side of the clamping insert 59 in such a manner that each supporting web 60 is connected to its one adjacent supporting web by means of a connecting web 61 arranged on the one side of the clamping insert 59 and projecting into the one circumferential direction, whilst it is connected to the other adjacent supporting web by means of a connecting web 62 placed on the other side of the clamping insert 59 and projecting into the opposite circumferential direction. In this case, the connecting webs 61, 62 provided on the opposite ends of the clamping insert 59 form clamping portions K1 and K2 of the clamping insert 59 which are spaced apart from one another. The connecting webs 61, 62 forming the clamping portions K1 and K2 are tapered toward the free ends of the clamping insert 59 in such a manner that the clamping portions K1 and K2 in each case carry at least one clamping inclination 63, 64 which are beveled in relation to the longitudinal axis of the clamping insert 59 and which interact with counter inclinations 65 or 66 of the rotary drive 1 associated with them in such a manner that the clamping portions K1 and K2 are pressed against the hollow glass shaft 8 as a result of axial pressurization of the clamping insert 59. As the clamping insert 59 has a loop-shaped or meander-shaped outer contour as a result of the supporting webs 60 and the connecting webs 61, 62 provided alternately on the opposite end regions of the supporting webs 60 and as said outer contour of the clamping insert 59, where required, can be widened in circumference in a simple manner, the clamping insert 59 is able to be comfortably positioned on the hollow glass shaft 8.

From FIG. 6 and the longitudinal section of the detail in FIG. 7 which shows the region in FIG. 6 marked by VII, it is clear that the clamping insert 59 is insertable from the side of the hub 58 facing the evaporation vessel 5 into said hub as far as up to a ring shoulder realized as a counter inclination 65 on the inside circumference of the hub 58, and that for the axial pressurization of the clamping insert 59 a clamping screw ring 67 can be releasably screwed onto the hub 58, said clamping screw ring acting upon the clamping portion K2 of the clamping insert 59 protruding over the hub 58 with a counter inclination 66 which is provided on the inside circumference of the clamping screw ring 67.

As the clamping insert 59 has a loop-shaped or meander-shaped outer contour as a result of the supporting webs 60 and the connecting webs 61, 62 provided alternately on the opposite end regions of the clamping insert 59 and as said outer contour of the clamping insert 59 when required can be widened in circumference in a simple manner, the clamping insert 59 is able to be positioned comfortably on the hollow glass shaft 8. The flexibility of the clamping insert 59 is achieved as a result of the axially extending narrow supporting webs 60 and the connecting webs 61, 62 connecting them. In the regions of the force transmission, namely in the clamping portions K1 and K2, the clamping portion 59 is designed in contrast with a large area in order to obtain plane clamping of the hollow glass shaft 8 serving as the vapor feedthrough. The friction generated fixes the hollow glass shaft 8 in a play-free manner in the hub 58 of the rotary drive 57. A circumferential nose 92, which is realized here as an (interrupted) annular flange, engages in an annular groove 93 on the inside circumference of the hub 58 and secures the clamping insert 59 axially in the hub 58, is provided on the outside circumference of the clamping insert 59. When the hollow glass shaft 8 is disassembled, the clamping insert 59 consequently remains in the hub 57 and the clamping screw ring 67 is simply released and does not have to be removed in order to remove the hollow glass shaft 8 out of the hub 58 of the rotary drive 57.

It can be seen in FIGS. 6 and 7 that the hollow glass shaft 8 carries on its outside circumference an indentation 68 which is realized as an annular groove and has associated therewith an elevation 69, which is realized as an annular bead, on the inside circumference of the clamping insert 59. As the elevation 69 provided on the clamping insert 59 is arranged in the part region of the clamping insert 59 protruding over the hub 58 and in particular on the inside circumference of the clamping portion K2 protruding over the hub 58, the hollow glass shaft 8 can also still be inserted subsequently into the clamping insert 59 located in the hub 58 or removed from it when, for example, an exchange of the evaporation vessel 5 also requires a change in the hollow glass shaft 8.

It is clear is FIG. 6 that the hollow glass shaft 8 serving as a vapor feedthrough is pushed through the hub 58 of the rotary drive 57 and is clamped in the hub 58 by means of the clamping insert 59, which is situated between the hub 58 and the hollow glass shaft 8, such that a rotation of the hub 58 of the rotary drive 57 about a longitudinal axis of the hub 58 leads to a corresponding rotation of the clamping insert 59, of the hollow glass shaft 8 and of the evaporation vessel 5 which is non-rotatably connected to the hollow glass shaft 8. The hub 58, the clamping insert 59 and the hollow glass shaft 8 are arranged concentrically with respect to one another. The non-rotatable connection between the hollow glass shaft 8 and the evaporation vessel 5 is ensured by a ground-in connection which is preferably realized as a taper-ground joint where the hollow glass shaft 8 engages in a ground-in sleeve which is realized on a vessel neck of the evaporation vessel 5 by way of its side facing the evaporation vessel 5 on which a ground-in core 94 is realized. An additional ground-in clamp 70 (cf. FIG. 1) can be provided to secure the ground-in connection between the hollow glass shaft 8 and the evaporation vessel 5.

It can be seen in FIG. 6 that the clamping screw ring 67 carries a thread 71, which interacts with a counter thread 72 on a forcing screw ring 73. When the forcing screw ring 73 is released from the clamping screw ring 67, the forcing screw ring 73 presses onto the evaporation vessel 5 and onto the vessel neck thereof in such a manner that the clamping or ground-in connection between the evaporation vessel 5 and the hollow glass shaft 8 carrying the evaporation vessel 5 is released.

Figure 10:
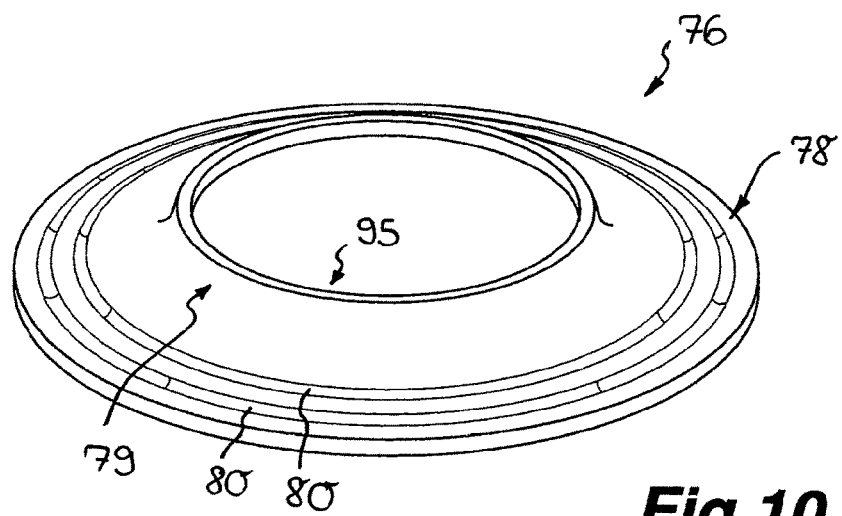
FIG. 10 shows a perspective representation of the sealing ring from FIG. 9.
Figure 9:
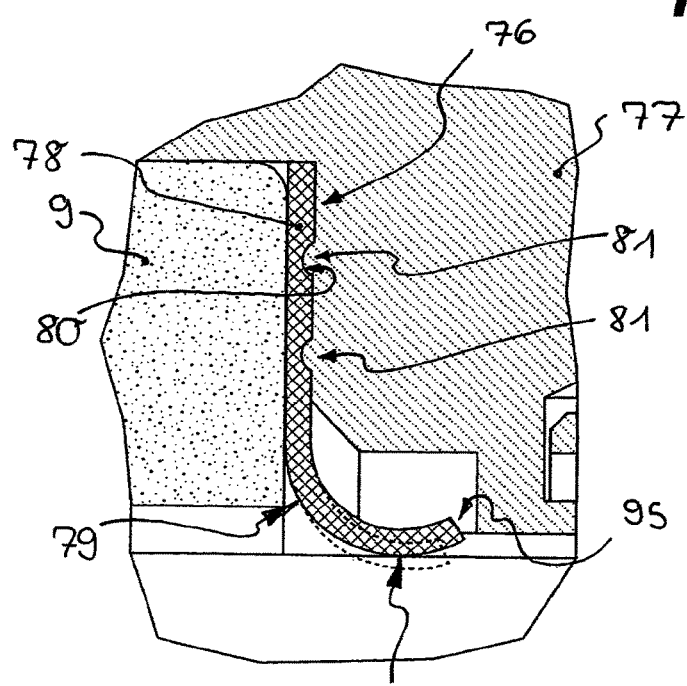
FIG. 9 shows the hollow glass shaft, which penetrates the hub of the rotary drive, in the region of a sealing ring which serves as a bearing ring seal, which sealing ring is clamped by way of an outer clamping edge between the cooler-side connecting piece and a drive housing of the rotary drive and abuts sealingly against the rotating hollow glass shaft by way of an inside ring zone.

The hollow glass shaft 8 which is realized as a vapor feedthrough reaches by way of its shaft end remote from the evaporation vessel 5 into the connection opening 74 of the connecting piece 9 leading to the cooler 6 and is sealed in relation to said connecting piece 9 with a bearing ring seal which is shown in more detail in FIGS. 6, 9 and 10. Said bearing ring seal is formed by a sealing ring 76 which is clamped between the connecting piece 9 and a drive housing 77 of the rotary drive 57 and abuts sealingly against the rotating hollow glass shaft 8. The sealing ring 76 is realized as a ring disk, the outer ring zone 78 of which serves as a clamping edge. The ring disk comprises a ring zone 79 which is bent over in the longitudinal extension of the hollow glass shaft 8 so that the sealing ring 76 abuts sealingly by way of a part region T of the ring disk which is oriented in the longitudinal direction of the hollow glass shaft 6. In this case, the part region T of the ring disk which is oriented in the longitudinal direction of the hollow glass shaft 8 abuts in an elastic manner against the hollow glass shaft 8 such that permanent sealing which is always consistently good is ensured in said region. The sealing ring 76 is realized in one piece and is producible at low expenditure as a material compound. A Teflon compound which excels as a result of a low coefficient of friction and reduced wear is preferred in this case.

The sealing ring 76, which is developed in a J-shaped or U-shaped manner in longitudinal section and the inside edge 95 of which defining the ring opening can be curved outward in a direction remote from the hollow glass shaft 8, comprises at its clamping edge at least one annular groove 80, with which a complementary annular bead 81 on the adjacent end edge of the drive housing 77 can be associated.

A comparison of the inner ring zone 79 shown in FIG. 9 on the one hand in continuous lines and on the other hand in broken lines indicates that said ring zone 79 lies pre-stressed in the direction toward the hollow glass shaft 8 in such a manner that as a result, in the case of wear, the sealing ring 76 abutting against the hollow glass shaft 8 is automatically readjusted.

The clamping insert 59 is preferably realized as a plastics material part and in particular as an injection molded plastics material part. As in the region of the inner ring zones 79 of the sealing ring 76 the glass of the hollow glass shaft 9, the clamping insert 59 in particular produced from plastics material and the preferably metal hub 58 of the rotary drive 57 abut against one another under pressing pressure, such a material choice for said individual parts 9, 59, 58 provides the ideal combination between softness, rigidity and frictional engagement for said individual parts which rotate with one another.

The rotary drive 57 has associated therewith a motor control which is not shown any further and preferably has stepless speed adjustment in particular with the possibility to reverse the direction of rotation. To avoid solid residues adhering to the inside wall of the vessel, in particular during a drying process, an operating mode which provides periodic reversal of the direction of rotation can be sensible. In order to bring about automatic cutout of the rotary evaporator 1 if the rotary movement is blocked, monitoring of the motor current is provided. A smooth startup of the rotary drive 57 is provided at the beginning of the rotary movement, to which end a corresponding start characteristic which can provide, for example, a limit to the motor current, is filed in the motor control of said rotary drive.

The tempering vessel 10 serves for tempering the liquid bath which is situated in the tempering vessel 10 and in particular for the controlled supply of heat into the evaporation vessel 5. The tempering vessel 10 comprises to this end an electric tempering device and in particular an electric heating device. The oil or water used as tempering liquid is circulated as a result the rotation of the evaporation vessel 5 in such a manner that a homogeneous temperature distribution is ensured. The inertia of the bath temperature stabilizes the heating temperature when boiling commences in the evaporation vessel 5 (evaporative coldness).

In order to be able to fill and empty the tempering vessel 10 in a simple manner, the tempering vessel 10 is placed in a removable manner onto the device stand 2 of the rotary evaporator. The device stand 2 is sufficiently stable in order to exclude the rotary evaporator 1 falling over even when the tempering vessel 10 has been removed. At least one positioning projection which interacts with an associated positioning indentation on the tempering vessel 10 or on the device stand 2 is provided on the device stand 2 or on the tempering vessel 10. The rotary evaporator 1 preferably comprises two such positioning projections, which interact in each case with a positioning indentation and protrude for example in a journal-like manner, the one of which is intended for electrically contacting the tempering device provided in the tempering vessel 10 by way of an electrical connection on the device stand and the other positioning projection of which is intended for contacting the signal connection between the rotary evaporator 1 and a temperature sensor incorporated into the tempering vessel 10.

An electric coupling, which is intended for electrically contacting the tempering device provided in the tempering vessel by way of an electrical connection on the device stand, is arranged in the region of the positioning projection and the positioning indentation, which are movable in an approximately axially-parallel manner with respect to the rotational axis of the rotary drive 57. In order to vary the position of the evaporation vessel 5 in relation to the device stand 2 and in order to be able to use variously large evaporation vessels 5 in the rotary evaporator 1, the at least one positioning projection provided on the device stand 2 or the positioning indentation thereon is held so as to be movable by means of a sliding guide which is not shown here in any more detail. This sliding guide has at least two sliding parts which interlock in a telescopic manner, one sliding part of which is held in an immobile manner on the device stand 2 and another sliding part of which carries the at least one positioning projection or the at least one positioning indentation.

It is clear from FIG. 1 that the tempering vessel 10 comprises an approximately triangular basic form at least in its clear inner cross section and preferably also in its outer cross section. In order to counteract the tempering liquid located in the tempering vessel 10 sloshing about in operation and when the tempering vessel 10 is being transported, the tempering vessel 10 has vertically oriented, that means extensively perpendicular vessel inside walls 88 except in the region of a spout 87. The spout 87 is provided in the extension of the apex line 75 of the triangular basic form, the apex line 75 being oriented in the direction facing the evaporation vessel 5. Ergonomic recessed grips, by way of which the tempering vessel can be comfortably gripped, are provided on the outside circumference of the tempering vessel 10. A scale preferably provided on at least one of the inside walls 88 of the vessel indicates the fill level of the tempering liquid. As the tempering vessel 10 is displaceable along the rotational axis, a large spectrum of evaporation vessels can be used. Even larger evaporation vessels 5 can be immersed in the tempering vessel 10 because said vessel is developed in a correspondingly deep manner. A transparent cover 89 can be placed on the tempering vessel 10. The cover 89 comprises at least one first cover part 90 which can be placed on the top narrow edge of the tempering vessel 10, on which at least one second cover part 91 is held so as to be able to be pivoted or folded up. As the evaporation vessel 5, which in the majority of cases is under vacuum during operation, is produced from uncoated glass for the purposes of an improved heat transfer in the liquid bath and as preferably only the remaining components of the glass assembly 4 consist of break-proof glass or glass coated as a shatterproof protection, the cover 89 serves as shatterproof protection.

The tempering vessel 10 comprises a fill level sensor which is connected in a control manner to a dosing pump which is connected to a tempering liquid supply. The fill level sensor is a component part of a fill level monitoring means which, when falling below a minimum level of tempering liquid, brings about an emergency cutoff. In addition to or instead of this, the fill level sensor can also be a component part of a fill level regulating means which is intended for compensating evaporation losses.

Figure 11:
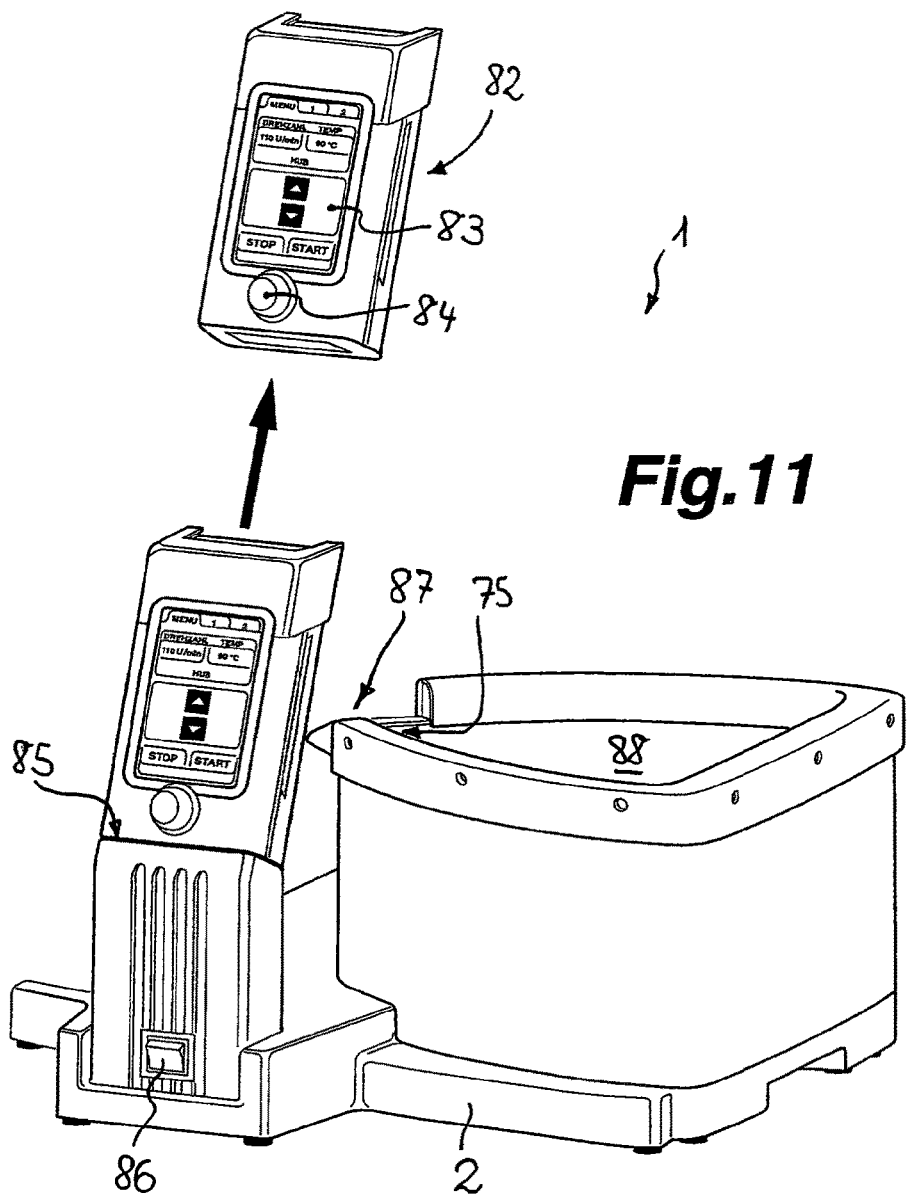
FIG. 11 shows a representation of a detail of the rotary evaporator from FIG. 1 in the region of its control elements realized as a remote control unit.

From a comparison of FIGS. 1 and 11 it is clear that the operation of the rotary evaporator 1 is effected by means of a central control unit 82 which enables direct access to all the technical functionalities and consequently, among other thing, also to the rotary drive 57, the lifting drive and the tempering device provided in the tempering vessel 10.

In order also to be able to operate the rotary evaporator 1 when it is situated in a protected manner for example in a vent, the control unit 82 is realized as a remote control unit which is detachable from the rotary evaporator 1 and is preferably wireless. A data transmission interface which, for example, can be realized as a USB interface, allows for the process control and/or the documentation of the process parameters on an external data processing system and in particular on the PC. The remote control unit 82 which is usable as a wireless remote control comprises a display 83 which is preferably developed as a touch screen with intuitive control elements which are adapted to the operating mode. A control button 84, which is realized here as a push-and-turn button and can be utilized, for example, to input numerical values, is provided on the control unit 82.

A console or compartment 85 for the control unit 82, which ensures an optimum control height of the control elements and of the display 83 when the control unit 82 is deposited therein and which, for this purpose, protrudes above the device stand 2, is provided on the rotary evaporator 1. As an option, the rotary evaporator according to the invention can either be operated directly with the remote control unit 82 located on the console 85 or actuated by means of the remote control unit 82 at a distance. A mains switch 86, which is also usable as an emergency cutoff, is arranged so as to be easily reachable on the front side of the rotary evaporator 1.

The display 83 which is developed as a touch screen serves, for example, to indicate the actual temperature in the liquid bath, the required temperature of the tempering device incorporated into the tempering vessel 10, the speed of the rotary drive or to indicate comparable process parameters. In order to select the control functions visible on the display 83 and/or to be able to modify the process parameters, the control button 84 can also be used in addition to or instead of this. In order to develop the operation of the control device, which is preferably situated in the rotary evaporator 1 and can also include the motor control means for the rotary drive 57, in as simple a manner as possible, individual functions of the control device are arranged in a menu structure which can be shown on the display 83, the scrolling through the individual menus being effected by means of the control button 84 and/or the display 83 which is realized, where applicable, as a touch screen.

The compartment or console 85, which projects on the rotary evaporator 1 above the device stand 4 thereof, is provided for the supporting or depositing of the remote control unit 82. The compartment or console 85 has at least one contact system which is releasably connectable to the control unit 82 and comprises for the batteries located in the control unit 82 for supplying power to the charging system and preferably also for the conductor-based control connection between the at least one control element 83, 84 of the control unit 82 and the control device should the wireless control connection not function. If the control unit 82 rests on the compartment or console 85, the wireless control connection is temporarily adjusted for the benefit of a conductor-based control connection between the at least one control element 83, 84 provided on the control unit 82 and the control device.

The control device of the rotary evaporator 1 also comprises an emergency cutout function, the triggering of which interrupts the power supply to the tempering device in the tempering vessel 10 and triggers the movement upward of the glass assembly 4, which is held so as to be movable on the guide tower 3, into the inoperative position. In this case, the emergency cutout function stored in the control device can be triggered, for example, manually at a special emergency cutout switch on the control unit 82 or at the mains switch 86 of the rotary evaporator 1 or can also be triggered automatically when the control unit 82 is no longer supplied with power or the wireless control connection between the remote control unit 82 and the rotary evaporator 1 is interrupted. As the power supply to the tempering device in the tempering vessel 10 is interrupted, further uncontrolled heating up of the test installation is not to be feared. As the evaporation vessel 5 is also moved out of the operating position located in the liquid bath into the inoperative position provided outside the tempering vessel 10, the liquid situated in the evaporation vessel 10 cannot be unintentionally heated up by the residual heat situated in the liquid bath.

For example, the actual temperature of the tempering liquid located in the tempering vessel 10 can also be read-off on the display 83 of the control unit 82. The necessary required temperature of the tempering liquid located in the tempering vessel 10 can be predefined by means of the display 83 realized as a touch screen and/or the control button 84. In the same way, a change in the rotational direction of the rotary drive 57 preferably in selectable time intervals can also be predefined in the control device. Finally it can also be predefined by means of the control unit 82 how far the evaporation vessel 5 of the glass assembly 4 is to be moved downward on the guide tower 3, a fine adjustment of the depth of immersion of the evaporation vessel 5 in the tempering vessel 10 can also be possible by rotating the control button 84.

As a result of heating up the evaporation vessel 5 in the liquid bath of the tempering vessel 10, the solution located in the evaporation vessel 5 evaporates and the vapor flows through the hollow glass shaft 8 which serves as a vapor feedthrough into the connecting piece which leads to the cooler 6. The vapor can condense in the cooler 6 and flow off into the collecting vessel 7. A separation of material constituent parts is achieved as a result of the boiling points thereof differing such that in the case of a predefined temperature certain materials can evaporate, whilst other materials initially still remain in the evaporation vessel. As a result of applying a vacuum to the glass assembly 4, the boiling temperatures can be lowered, as a result of which solvents which boil at higher temperatures are able to be evaporated at a lower temperature than would normally be the case. In the glass assembly 4 which is under vacuum, substances which are temperature-sensitive can also be distilled. As a result of working at a lower boiling temperature, destruction of such temperature-sensitive substances can be prevented. The sealing ring 76, which serves as a bearing ring seal, in this case seals the rotating hollow glass shaft 8 against atmospheric pressure and thus ensures that the vacuum in the interior of the glass assembly 4 is maintained. As the inside diameter of the sealing ring 76 is somewhat smaller than the diameter of the hollow glass shaft 8 in this region, the sealing ring 76 is pre-stressed and this is increased by the pressure difference present at the sealing ring. When the sealing ring 76 becomes worn as a result of friction, the bearing ring seal readjusts automatically as a result of the pre-stressing of the sealing ring 76. The annular beads 81 provided on the drive housing 77 press the sealing ring in a ring-shaped manner against the connecting piece 9 in such a manner that the magnification of the surface pressure along said two closed lines additionally provides for an optimum seal.

The evaporation process is terminated by a controlled shut-down which is effected independently of the power supply by lifting the evaporation vessel 5 out of the tempering vessel 10, by stopping the rotation of the rotary drive 57, by suddenly eliminating the vacuum created in the glass assembly 4 or by shutting down the cooling of the cooler 6, the cooler 6 having associated therewith an interface for an on/off valve for this purpose. A shut-down of the rotary evaporator 1 and consequently termination of the evaporating process can be triggered by a user by achieving a predefined process parameter (process end), a process error or by a power failure.

LIST OF REFERENCE NUMBERS

Rotary evaporator 1
Device stand 2
Guide tower 3
Glass assembly 4
Evaporation vessel 5
Cooler 6
Collecting vessel 7
Hollow glass shaft 8
Connecting piece (of the cooler) 9
Tempering vessel 10
Hose connection (on the glass assembly) 11
Hose connection (on the glass assembly) 12
Hose connection (on the glass assembly) 13
Hose line (laid freely) 14
Hose line (laid freely) 15
Hose line (laid freely) 16
Channel 17
Hose line (in the guide tower) 18
Hose line (in the guide tower) 19
Hose line (in the guide tower) 20
Cradle 21
Profile portion (hollow profile) 22
Profile portion 23
Cavity (between the profile portions) 24
Guide slot 25
Narrow edge (of the profile portion 22) 26
Narrow edge (of the profile portion 23) 27
Cradle guide 28
Guide bar (of the cradle guide 28) 29
Guide bar (of the cradle guide 28) 30
Guide hole (in the cradle 21) 31
Guide hole (in the cradle 21) 32
Connecting arm 33
Gas-filled spring 34
Cable winch 35
Cable drum 36
Cable 37
Block and pulley 38
Guide rollers (of the block and pulley) 39
Guide rollers (of the block and pulley) 40
Electric drive (of the cable winch) 41
Pivot axis (of the holder) 42
Carrying part (of the holder) 43
Spindle drive 44
Adjusting spindle 45
Spindle thread 46
Pivot axis (of the adjusting spindle on the holding part) 47
Pivot axis (of the spindle nut) 48
Spindle nut 49
Adjusting wheel 50
Graduation (for lift height) 51
Scale (of the graduation 51) 52
Edge (of the cradle 21 as indication of the lift height) 53
Graduation (for the pivot angle) 54
Scale (of the graduation 54) 55
Edge (on the carrying part 43 as indication of graduation 54) 56
Rotary drive 57
Hub 58
Clamping insert 59
Supporting webs 60
Connecting webs (left) 61
Connecting webs (right) 62
Clamping inclination (left) 63
Clamping inclination (right) 64
Counter inclination (in the hub) 65
Counter inclination (in the clamping screw ring) 66
Clamping screw ring 67
Indentation 68
Elevation 69
Ground-in clamp 70
Thread (on clamping screw ring 67) 71
Counter thread (on forcing screw ring) 72
Forcing screw ring 73
Connection opening (of the connecting piece) 74
Apex line 75
Sealing ring 76
Drive housing 77
Outer ring zone (of the sealing ring) 78
Bent-over ring zone (of the sealing ring) 79
Annular groove (on the sealing ring) 80
Annular bead (on end edge of the drive housing) 81
(Remote) control unit 82
Display 83
Control button 84
Compartment or console (for control unit) 85
Mains switch 86
Spout 87
Vessel inside walls of the tempering vessel 88
Cover 89
Fixed cover part 90
Foldable cover part 91
Nose 92
Annular groove 93
Ground-in core 94
Inside edge 95
Clamping portion (left) K1
Clamping portion (right) K2
Part region (of the sealing ring) T

The invention claimed is:

1. A rotary evaporator (1) comprising a device stand (2), from which a guide tower (3) projects, said guide tower has a holder, on which an evaporation vessel (5) is held so as to be pivotable about a first horizontal pivot axis (42) and which comprises a holding part which is connected to the guide tower (3), is movable laterally to the guide tower (3) in a longitudinal direction thereof and on which a carrying part (43), which is connectable to the evaporation vessel (5), is held so as to be pivotable about and supported at the first horizontal pivot axis (42), the holding part comprises a cradle (21), a spindle drive (44) which has an adjusting spindle (45) with a self-locking spindle thread (46), and is provided to adjust and secure a chosen pivot position, the adjusting spindle (45) is mounted on the holding part so as to be pivotable, but immovable in an axial direction thereof, the adjusting spindle (45) interacts with a spindle nut (49) which is held on the carrying part (43) with a thread of the spindle nut rotationally fixed and the spindle nut being pivotable on the carrying part about a second horizontal axis (47) that is normal to the adjusting spindle and located at a height vertically below the first horizontal pivot axis (42), the adjusting spindle (45) comprises an adjusting wheel (50) or handle on at least one spindle end, a graduation (54), which is arranged between the holding part and the carrying part (43), is provided for positioning the carrying part (43), the graduation (54) has a scale (55), and the scale (55) has associated therewith a measuring line or indicator, and a second graduation (51) arranged between the guide tower (3) and the cradle (21) having a second scale (52) that indicates a height position of the cradle (21).

2. The rotary evaporator as claimed in claim 1, wherein the adjusting spindle (45) is held on the holding part and on the carrying part (43) so as to be pivotable about the second horizontal axis (47).

3. The rotary evaporator as claimed in claim 1, wherein the adjusting spindle (45) is held on the holding part or on the carrying part (43) so as to be pivotable about the second horizontal axis or a third horizontal pivot axis (48).

* * * * *